United States Patent [19]

Kent et al.

[11] 4,222,803

[45] Sep. 16, 1980

[54] METHOD OF MAKING FABRIC COVERED CEILING BOARD

[75] Inventors: Raymond C. Kent; Charles Haines, Jr., both of Lancaster, Pa.

[73] Assignee: Armstrong Cork Company, Lancaster, Pa.

[21] Appl. No.: 912,550

[22] Filed: Jun. 5, 1978

[51] Int. Cl.2 ........................ B29C 27/14; B29C 27/22

[52] U.S. Cl. ........................................ 156/85; 156/212; 156/229; 264/230; 264/257; 264/292; 264/324; 264/342 R

[58] Field of Search ................. 156/214, 213, 212, 84, 156/85, 216, 229, 242; 428/95, 96, 138, 198, 201, 317, 126, 130, 156, 157, 161; 264/257, 230, 342 R, 134, 137, 259, 291, 292, 320, 324, 236; 181/291, 294, 296, 207, 284, 290, 292

[56] References Cited

U.S. PATENT DOCUMENTS

| | | | |
|---|---|---|---|
| 1,867,575 | 7/1932 | Loetscher | 156/213 |
| 2,797,179 | 6/1957 | Reynolds et al. | 264/257 |
| 2,802,764 | 8/1957 | Slayter et al. | 428/126 |
| 3,010,859 | 11/1961 | Stephens et al. | 156/214 |
| 3,094,716 | 6/1963 | Friedman | 156/212 |
| 3,149,018 | 9/1964 | Jacobson | 156/213 |
| 3,153,304 | 10/1964 | Evangelista | 181/284 |
| 3,154,453 | 10/1964 | Demke et al. | 156/212 |
| 3,202,561 | 8/1965 | Swanson et al. | 156/216 |
| 3,448,573 | 6/1969 | Glen et al. | 264/230 |
| 3,583,522 | 6/1971 | Rohweder | 181/290 |
| 3,673,295 | 6/1972 | Winchklhofer et al. | 156/84 |
| 3,701,707 | 10/1972 | Scholl et al. | 156/212 |
| 3,920,872 | 11/1975 | Ollinger | 428/95 |
| 3,935,049 | 1/1976 | Schmidt et al. | 156/216 |
| 4,098,938 | 7/1978 | Arters | 264/134 |

*Primary Examiner*—W. E. Hoag

[57] ABSTRACT

The invention herein is directed to a method of providing a ceiling board with a fabric facing. The fabric facing is molded to the irregular shape of the ceiling board so that there is no wrinkling or gathering of the fabric as it is shaped to the configuration of the ceiling board. The lack of wrinkling and gathering is secured without the use of a laborious hand-cutting operation.

2 Claims, 1 Drawing Figure

4 5 6 7 8 9 2

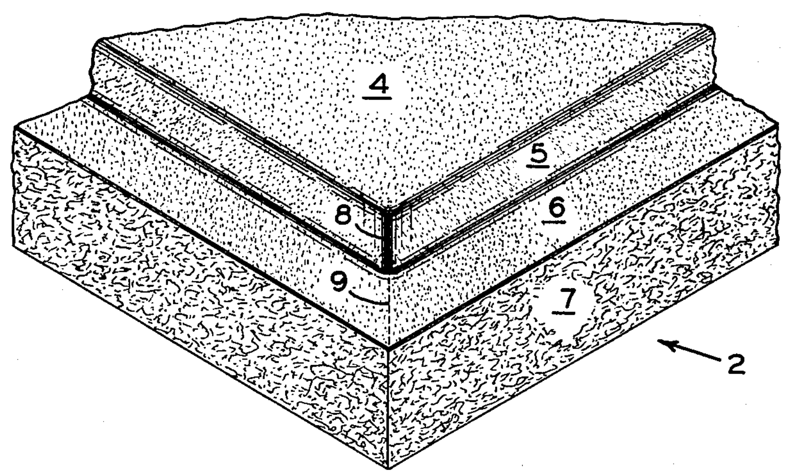
4
5
6
8
9
7
2

METHOD OF MAKING FABRIC COVERED CEILING BOARD

BACKGROUND OF THE INVENTION

1. Field of the Invention

The invention is directed to a technique for making a ceiling board and, more particularly, to a technique for providing a fabric facing on an irregular shaped ceiling board.

2. Description of the Prior Art

U.S. Pat. No. 3,920,872 is directed to a fabric covered ceiling board material. The ceiling board structure does not have an irregular configuration such as would require fitting of the fabric to the board, which fitting, if done improperly, would result in the generation of wrinkles or gathers.

SUMMARY OF THE INVENTION

The invention is directed to a method for covering with a fabric facing a ceiling board having a face surface with an irregular edge configuration. The ceiling board has an edge configuration such that the fabric may not be adhered to the face and the edge of the ceiling board without wrinkling and gathering of the fabric as it is shaped to the configuration of the ceiling board unless the fabric was laboriously hand cut to fit it to the ceiling board. The inventive method herein involves the placing of a flat, uncut fabric facing material on the face surface of a ceiling board with the fabric being of a size greater than the face surface area of the ceiling board. The ceiling board and fabric are placed in a heated mold which has a mold cavity shaped to the contour of the face and the irregular edge of the ceiling board. The fabric and ceiling board are pressed into the mold cavity so that by pressure the fabric facing is pressed down against the irregular edge configuration of the ceiling board, and by heat, said fabric is streched or shrunk to mold said fabric to the contour of the ceiling board so that the fabric assumes the configuration of the surface and edge of the ceiling board without the existence of any wrinkling or gathering of the fabric molded to the ceiling board.

BRIEF DESCRIPTION OF THE DRAWING

The single view of the drawing is a perspective view of a product made according to the inventive method herein.

DESCRIPTION OF THE PREFERRED EMBODIMENT

As seen in the FIGURE of the drawing, the ceiling board 2 has a flat top surface 4. It then has an irregular edge configuration on each of its four sides. This irregular edge configuration involves a sloped surface 5 which drops away from the flat surface 4 and then a flat surface 6 which is parallel with the flat surface 4 but positioned therebelow, and then finally an edge 7 which is perpendicular to the surface 6. It is desirable that the surfaces 4, 5, and 6 be covered with a fabric material and be fitted with the fabric material so that there will be no wrinkles or gathers in the fabric material. The ceiling board structure would be approximately 2′ square and would be positioned in a suspended ceiling system wherein the surface 6 rests upon the horizontal runners of the suspended ceiling system, and the surfaces 4 and 5 extend below the plate of the horizontal runners of the suspension system. Normally when a fabric would be fastened to surfaces 4, 5, and 6, the fabric would have to be cut and gathered, particularly at the corners of the sloped surface 5. There would be no problem positioning the fabric relative the surface 4, down surface 5, and across surface 6. However, for example, at corner 8 there would tend to be a gathering of excess material while at junction 9, where two right angle surfaces 6 come together, there would be a stretching of the fabric. Normally a good fit at these points would require laborious hand-cutting and positioning operations.

The inventive method herein overcomes the need for utilizing a laborious hand-cutting technique for fastening a fabric to the board. The board will have a structure which is the same as that of U.S. Pat. No. 3,920,872. It will be covered with the same type of fabric as is utilized in the patent. Specifically, the ceiling board structure is a fiberboard structure of approximately ½″ in thickness and is made from either mineral wool or wood fiber material such as indicated in U.S. Pat. No. 3,920,872. The fabric facing will be a fabric-like material of modacrylic or other heat shrinkable and stretchable material, and it is the same construction as that set forth in U.S. Pat. No. 3,920,872. The fabric is cut larger than the overall size of the ceiling board. Conventional adhesive, such as that set forth in U.S. Pat. No. 3,920,872, will be used to bond the fabric facing to the ceiling board. The ceiling board is placed upright in press structure and the oversized fabric facing is placed on top of the ceiling board surface 4 so that it extends across all the edges of the ceiling board. The upper movable part of the press contains a mold cavity which is a mirror image of the contour of the surfaces 4, 5, and 6 of the ceiling board. The mold cavity is slightly oversized over that of the ceiling board shape in order to allow for the existence of the fabric positioned on the ceiling board. With the use of a modacrylic or polyester fabric, the mold cavity of the press is applied against the fabric covered ceiling board. The mold cavity is heated to a temperature of 125° F. to 400° F. and applies a force against the fabric and ceiling board in the range of 2 psi to 25 psi. The process requires almost no dwell time and can be readily carried out with only 2 seconds of dwell time.

During the time of pressing, the fabric facing is pushed down tightly against surface 4 and pushed against surfaces 5 and 6 so that the adhesive interface therebetween will hold the fabric in place. The heat from the mold cavity will cause an appropriate stretching or shrinking of the fabric, particularly at points 8 and 9 to mold the fabric to the contour of the ceiling board so that the fabric assumes the configuration of the surface and edge of the ceiling board without the existence of any wrinkles or gathers of the fabric molded to the ceiling board. Excess fabric can then be cut off from the edge of the ceiling board. This excess fabric would be any fabric which would overhang the edge between surface 6 and 7. The ceiling board is now ready to be positioned in a suspended ceiling system.

What is claimed is:

1. A method for covering with a fabric facing a ceiling board with four sides, a top and bottom, said board having a plurality of parallel flat surfaces on different planes on the top surface thereof, vertical surface joining these different parallel planes and providing corners and edges between these different planar surfaces, said corners being formed from the vertical and planar surfaces so that the fabric facing needs to be stretched or shrunk at different points when the fabric is shaped to the overall contour of the flat surface and edges of the four sides of the ceiling board, the method comprising the steps of:

(a) placing a heat shrinkable and heat stretchable fabric facing material on the top surface of the ceiling board preformed with flat surfaces on different planes with the fabric being of a size greater than the top surface area of the ceiling board and an adhesive between the fabric and the board, (b) positioning said ceiling board and fabric facing in a heated mold which has a mold cavity with the walls of the cavity shaped to the contour of the surfaces and edges of the ceiling board, said walls of the cavity having at least two planar parallel surface joined together by at least two vertical surfaces to form at least one corner, and (c) pressing said mold cavity walls against said ceiling board with said fabric facing so that by said pressing the fabric facing is pressed down against at least said two planar surfaces, at least said two vertical surfaces and their corresponding edge configuration and, by heat, said fabric is stretched at some points and shrunk at other points to mold said fabric to the contour of said ceiling board so that the fabric assumes the configuration of the surfaces, corners, and edges of the ceiling board without the existence of any wrinkles or gathers in the fabric molded to the ceiling board and the fabric is adhesively held to the ceiling board.

2. A method for covering with a fabric facing a ceiling board as set forth in claim 5, wherein the pressing is carried out at a pressure of 2 to 25 psi and the mold cavity is heated to a temperature of 125° F. to 400° F.

* * * * *